(12) United States Patent
Tsuneki et al.

(10) Patent No.: US 10,739,734 B2
(45) Date of Patent: Aug. 11, 2020

(54) MOTOR CONTROL APPARATUS

(71) Applicant: FANUC CORPORATION, Yamanashi (JP)

(72) Inventors: Ryoutarou Tsuneki, Yamanashi (JP); Satoshi Ikai, Yamanashi (JP); Takaki Shimoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/571,470

(22) Filed: Sep. 16, 2019

(65) Prior Publication Data

US 2020/0096955 A1    Mar. 26, 2020

(30) Foreign Application Priority Data

Sep. 21, 2018 (JP) .................. 2018-177726

(51) Int. Cl.
| | |
|---|---|
| *F15B 21/02* | (2006.01) |
| *G05B 13/02* | (2006.01) |
| *G05B 19/414* | (2006.01) |
| *F15B 21/08* | (2006.01) |

(52) U.S. Cl.
CPC .......... *G05B 13/0285* (2013.01); *F15B 21/02* (2013.01); *F15B 21/087* (2013.01); *G05B 19/4141* (2013.01); *G05B 2219/42152* (2013.01)

(58) Field of Classification Search
CPC ............ G05B 13/0285; G05B 19/4141; G05B 2219/42152; G05B 2219/45083; F15B 21/02; F15B 21/087
See application file for complete search history.

(56) References Cited

U.S. PATENT DOCUMENTS

| | | | | |
|---|---|---|---|---|
| 5,751,585 A | * | 5/1998 | Cutler ................. | B23K 26/083 700/161 |
| 5,936,366 A | * | 8/1999 | Hamamura .......... | G05B 13/024 318/560 |

(Continued)

FOREIGN PATENT DOCUMENTS

| | | |
|---|---|---|
| JP | 8-263143 | 10/1996 |
| JP | 11-231914 | 8/1999 |

*Primary Examiner* — Thai T Dinh
(74) *Attorney, Agent, or Firm* — Wenderoth, Lind & Ponack, L.L.P.

(57) ABSTRACT

A motor control apparatus including a controller that controls a servo motor or a spindle motor and includes a switching determining part that determines a switching condition of the controller based on axis position information on a motor related to control of the motor control apparatus, a machine learning part that adjusts one or more parameters for the controller by machine learning for each switching condition, and a parameter holding part that holds the parameter adjusted by the machine learning part for each switching condition. The switching determining part, when determining the switching condition after adjustment of the parameter, uses the adjusted parameter corresponding to the switching condition in the controller. The apparatus enables changing, and automatic adjustment, of a parameter or controller to be used depending on a switching condition of the parameter related to axis position information or a switching condition of the controller using the parameter.

5 Claims, 11 Drawing Sheets

(56) References Cited

U.S. PATENT DOCUMENTS

| | | | | |
|---|---|---|---|---|
| 7,915,848 B2* | 3/2011 | Iwashita | ................ | G05B 19/19 318/560 |
| 9,958,837 B2* | 5/2018 | Tsuneki | ................ | G05B 11/011 |
| 2006/0186845 A1* | 8/2006 | Terada | ................... | G05B 19/19 318/432 |

* cited by examiner of which is incorporated

MOTOR CONTROL APPARATUS

This application is based on and claims the benefit of priority from Japanese Patent Application No. 2018-177726, filed on 21 Sep. 2018, the content herein by reference.

BACKGROUND OF THE INVENTION

Field of the Invention

The present invention relates to a motor control apparatus.

Related Art

Conventionally, a general motor control apparatus is well known to adjust a servo gain such as a position loop gain and a speed loop gain and a parameter such as an acceleration/deceleration time constant depending on machining conditions, control conditions and the like. Alternatively, a known technique for a motor control apparatus includes, in order to use optimal parameters depending on machining conditions, control conditions and the like, setting and changing parameters in a feedback controller and/or a feedforward controller to optimal parameters on the basis of machining conditions, control conditions and the like, and switching a controller among a plurality of feedback controllers and/or feedforward controllers provided in advance, depending on machining conditions, control conditions and the like.

In an example, Patent Document 1 discloses a control gain switching method allowing to switch a control gain for controlling a motor depending on the presence or absence of backlash.

Patent Document 2 discloses a numerical control apparatus which includes parameter tables storing optimal parameter values for respective control conditions, so as to set optimal servo parameters depending on control conditions, and which is capable of selecting and setting a parameter table on the basis of the command to switch a parameter during the execution of an NC program.

Patent Document 1: Japanese Unexamined Patent Application, Publication No. H08-263143
Patent Document 2: Japanese Unexamined Patent Application, Publication No. H11-231914

SUMMARY OF THE INVENTION

However, in the technique according to Patent Document 1, a parameter itself is fixed basically. Once a parameter is fixed, the parameter is not to be finely adjusted thereafter depending on an operating environment and the like.

Specifically, in the technique according to Patent Document 1, a control gain is simply switched between two values depending on the presence or absence of backlash, and the two values are not to be adjusted depending on, for example, the amount of the backlash.

That is, in the technique according to Patent Document 1, an initially-set parameter value itself is not adjusted, and accordingly in the case where, for example, the operating environment of a machine tool changes, deterioration in quality of machining or control accompanied with the change is hardly suppressed.

Patent Document 2 discloses the technique in which an optimal parameter is set depending on a control condition. However, the parameter is to be changed only at the time of fast forward processing and at the time of cutting.

On the other hand, the characteristics of a machine tool, a robot or an industrial machine are known to change depending on an axis position. For example, in a machine tool using a ball screw, the resonance frequency and rigidity of the machine tool differ between the case where the axis is positioned at the edge of the ball screw and the case where the axis is positioned at the center.

In an example, as shown in FIG. 10, the length of a ball screw 8033 is set to 1, the end point of the ball screw 8033 in the side of a coupling 8031 is set to an origin 0, and the axis position corresponding to the position of a table 804 is set to x. In this case, an axial rigidity $K_t$ is known to be obtained by calculation in a formula (1) (hereinafter, referred to as Math. 1) below according to the following non-patent document, wherein $K_s$ denotes the rigidity of a screw axis, that is, the ball screw 8033, $K_n$ denotes the rigidity of a nut 8032, and $K_b$ denotes the rigidity of a bearing (not shown).

[Math. 1]

$$\frac{1}{K_t} = \frac{1}{K_s} + \frac{1}{K_b} + \frac{1}{K_n} \qquad (1)$$

Non-Patent Document

"Design and Control of Precision Positioning and Feed Drive systems" written by Atsushi Matsubara in 2008, published by Morikita Publishing Co., Ltd.

In the case of a single anchor, that is, the case where a screw axis in a motor side is fixed in the thrust direction (axial direction) and the radial direction (rotational direction) thereof, and where the screw axis in the opposite side to the motor is constrained only in the radial direction thereof, the value of $K_s$ in the formula (1) is known to be obtained by calculation in a formula (2) (hereinafter, referred to as Math. 2) below, wherein E denotes a longitudinal elastic modulus of the screw axis (steel) and $A_s$ denotes a screw axis sectional area.

[Math. 2]

$$K_s = \frac{EA_s}{x} \qquad (2)$$

In the case of a double anchor, that is, the case where a screw axis both in the motor side and the opposite side to the motor is fixed in the thrust direction and the radial direction thereof, the value of $K_s$ in the formula (1) is known to be obtained by calculation in a formula (3) (hereinafter, referred to as Math. 3) below.

[Math. 3]

$$\frac{1}{\frac{1}{K_s} + \frac{1}{K_b}} = \frac{1}{\frac{1}{K_b} + \frac{x}{EA_s}} + \frac{1}{\frac{1}{K_b} + \frac{l-x}{EA_s}} \qquad (3)$$

As described above, in each case, the axial rigidity thereof depends on the axis position.

On the other hand, in a two-inertia model of the ball screw 8033, the value of an anti-resonance frequency $\omega_a$ is known to be obtained by calculation in a formula (4) (hereinafter, referred to as Math. 4) below, wherein J denotes an inertia of a servo motor 800 and the ball screw 8033, M denotes mass of the table 804, and R [m/rad] denotes a conversion coefficient from rotation to linear motion.

[Math. 4]

$$\omega_a = \sqrt{K_t/M} \tag{4}$$

The value of a resonance frequency $\omega_n$ is known to be obtained by calculation in a formula (5) (hereinafter, referred to as Math. 5) below, further by use of an inertia ratio $\alpha = R^2 M/J$.

[Math. 5]

$$\omega_n = \sqrt{1+\alpha}\,\omega_a \tag{5}$$

As described above, both of the resonance frequency and the anti-resonance frequency depend on the axial rigidity and thus vary depending on the axis position.

Accordingly, since the rigidity, resonance frequency and anti-resonance frequency of a machine tool, a robot or an industrial machine vary depending on the axis position, a parameter for, for example, a feedback controller or a feedforward controller is to be adjusted for each axis position in order that a motor control apparatus exhibits high performance in control, and the setting of the parameter is to be changed or a controller is to be switched to the controller using the parameter, depending on the axis position. Neither of Patent Document 1 or Patent Document 2 discloses anything about the point in that a parameter for, for example, a feedback controller or a feedforward controller (hereinafter, also referred to as "controller") is to be adjusted for each axis position, and the parameter set in a controller is changed, or alternatively a controller is switched to the controller using the parameter, depending on the axis position.

The purpose of the present invention is to provide a motor control apparatus capable of adjusting one or more parameter(s) to be applied to a controller or a controller by machine learning depending on a position command value or the axis position information detected by a position detection device, and further capable of switching the parameter or the controller for each axis position by holding the parameters adjusted by the machine learning.

(1) A motor control apparatus (for example, "a motor control apparatus 200" to be described below) according to the present invention includes a controller configured to control a servo motor or a spindle motor of a machine tool, a robot, or an industrial machine. The motor control apparatus includes a switching determining part (for example, "a switching determining apparatus 300" to be described below) or first communication means configured to communicate with the switching determining part, a machine learning part (for example, "a machine learning apparatus 500" to be described below) or second communication means configured to communicate with the machine learning part, and a parameter holding part (for example, "a parameter holding apparatus 400" to be described below) or third communication means configured to communicate with the parameter holding part. The switching determining part is configured to determine a switching condition of the controller on the basis of position information on an axis related to control of the motor control apparatus. The machine learning part is configured to adjust one or more parameter(s) for the controller by machine learning for each of the switching conditions. The parameter holding part is configured to hold the parameter adjusted by the machine learning part for each of the switching conditions. The switching determining part, when determining the switching condition after adjustment of the parameter, uses the adjusted parameter corresponding to the switching condition in the controller.

(2) The motor control apparatus according to (1) may include a position command calculating part (for example, "a position command generating part 1011" to be described below) configured to generate a position command related to the axis, a position detecting part configured to detect a position related to the axis, a position controller (for example, "a position control part 2014" to be described below) configured to generate a speed command by use of the position command and feedback information on the position detected by the position detecting part, a speed detecting part configured to detect a speed, and a speed controller (for example, "a speed control part 2017" to be described below) configured to generate a torque command by use of the speed command generated by the position controller and feedback information on the speed detected by the speed detecting part. The machine learning part may adjust one or more parameter(s) for the position controller or the speed controller for each of the switching conditions.

(3) The motor control apparatus according to (1) may include a speed command generating part configured to generate the speed command, a speed detecting part configured to detect the speed, and a speed controller configured to generate a torque command by use of the speed command and feedback information on the speed detected by the speed detecting part. The machine learning part may adjust one or more parameter(s) for the speed controller for each of the switching conditions.

(4) The motor control apparatus according to (1) may include at least either one of a position feedforward controller (for example, "a position feedforward control part 2020" to be described below) and a speed feedforward controller (for example, "a speed feedforward control part 2021" to be described below). The position feedforward controller is configured to generate position feedforward information by use of the position command, and the speed feedforward controller is configured to generate speed feedforward information by use of the position command. The machine learning part may adjust one or more parameter(s) for at least either one of the position feedforward controller and the speed feedforward controller for each of the switching conditions.

(5) In the motor control apparatus according to any one of (1) to (4), the machine learning part may adjust a plurality of different types of parameters for one of the switching conditions, and, the switching determining part may use one parameter selected from among the plurality of parameters in the controller.

The present invention enables to provide a motor control apparatus capable of adjusting one or more parameter(s) to be used in a controller or a controller by machine learning depending on a position command value or the axis position information detected by a position detection device, and further capable of switching the parameter or the controller for each axis position, by holding the parameters adjusted by the machine learning.

DETAILED DESCRIPTION OF THE INVENTION

Some embodiments of the present invention will be described below in detail with reference to the drawings.

1 First Embodiment

[1.1 Overall Configuration]

Figure 1:
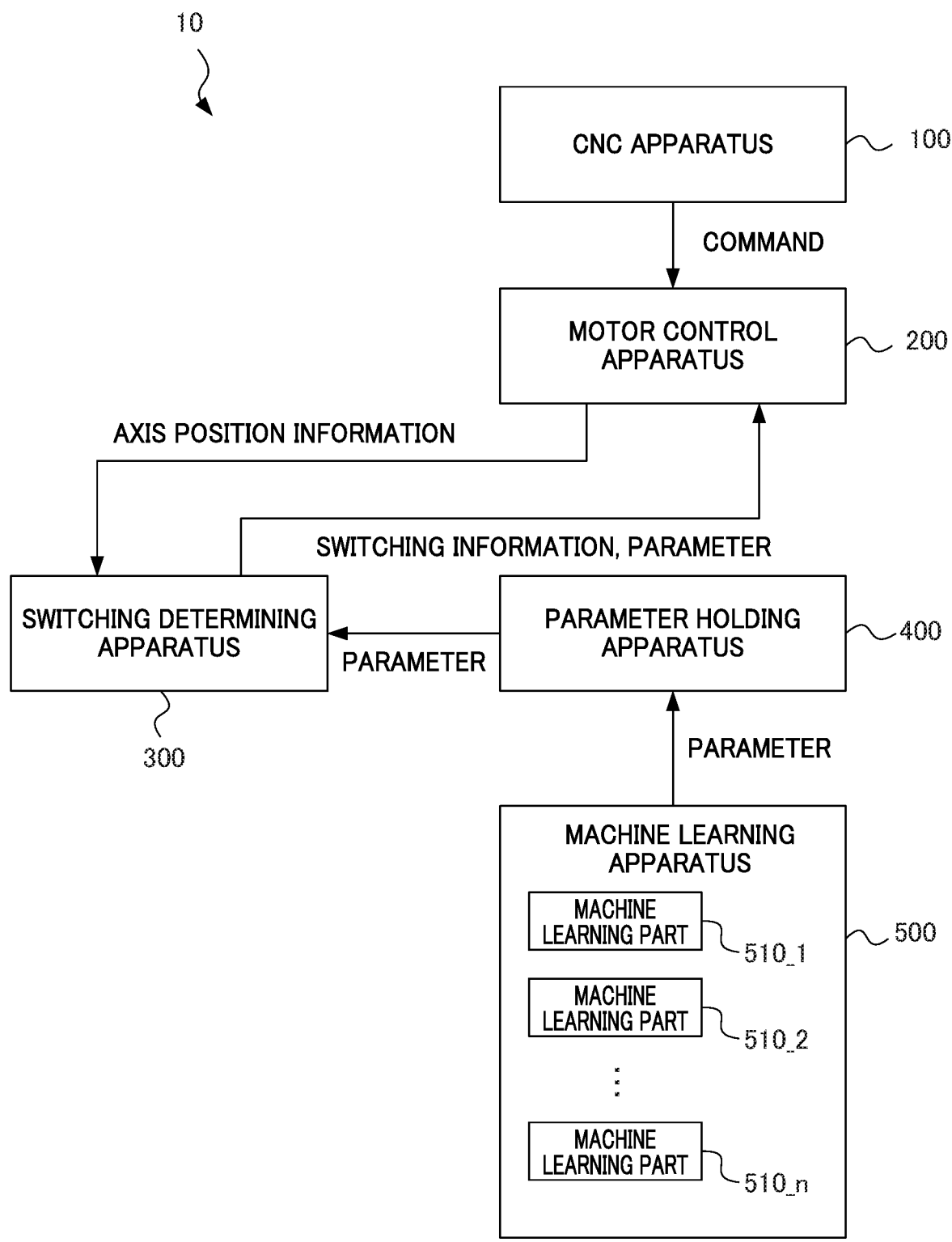
FIG. 1 is a block diagram illustrating the overall configuration of a motor control system including a motor control apparatus according to an embodiment of the present invention.

FIG. 1 is a block diagram illustrating a motor control system according to the first embodiment of the present invention. As shown in FIG. 1, a motor control system 10 includes a CNC (Computerized Numerical Control) apparatus 100, a motor control apparatus 200, a switching determining apparatus 300, a parameter holding apparatus 400, and a machine learning apparatus 500. Direct connection via a connection interface or connection via a network is provided each between the CNC apparatus 100 and the motor control apparatus 200, the motor control apparatus 200 and the switching determining apparatus 300, the switching determining apparatus 300 and the parameter holding apparatus 400, and the parameter holding apparatus 400 and the machine learning apparatus 500, whereby mutual communication is available. It is noted that the network is, for example, a LAN (Local Area Network) built into a factory, the Internet, a public telephone network, or a combination of these. The network is not particularly limited to a specific communication system, a wired connection or a wireless connection, or the like.

The CNC apparatus 100 calculates a position command value of a feed axis and a speed command value of a spindle on the basis of a machining program, and outputs a command including the generated position command value and a command including the generated speed command value to the motor control apparatus 200, to control a motor such as a servo motor or a spindle motor of a machine tool, a robot or an industrial machine, thereby controlling the machining performed by the machine tool, the robot or the industrial machine.

The motor control apparatus 200 generates a position command, a speed command and a torque command by respective controllers included in the motor control apparatus 200 itself, on the basis of the position command value or the speed command value acquired from the CNC apparatus 100, and outputs these commands to a motor such as a servo motor or a spindle motor, thereby controlling the motor. The motor control apparatus 200 performs position control, speed control, and current control by use of, for example, PI control, on the basis of the position command value acquired from the CNC apparatus 100, thereby generating a driving current for the motor in the feed axis. In an example, the motor control apparatus 200 generates a speed command on the basis of the positional error between the position command and the position feedback detected by the encoder provided on the motor in the feed axis (position control), generates a torque command for the motor in the feed axis on the basis of the calculated speed command and the feedback information on the speed detected by the encoder (speed control), and generates a driving current for the motor in the feed axis on the basis of the calculated torque command (current control).

In an example, the motor control apparatus 200 outputs axis position information to the switching determining apparatus 300 on the basis of the position command or the position feedback. The motor control apparatus 200 further acquires parameters to be used in the above-described controllers, from the parameter holding apparatus 400 via the switching determining apparatus 300, and further acquires switching information for switching the controllers and parameters to be used depending on the axis position, from the switching determining apparatus 300. The configuration of the motor control apparatus 200 will be detailed below with reference to FIG. 3.

The switching determining apparatus 300 determines a switching condition for switching the controller and the parameter to be used in the motor control apparatus 200, on the basis of the axis position information acquired from the motor control apparatus 200, and outputs, on the basis of the determination, the switching information indicating which controller and parameter are to be actually used by the motor control apparatus 200, to the motor control apparatus 200. The switching determining apparatus 300 further acquires the above-described parameter from the parameter holding apparatus 400, and further outputs the parameter to the motor control apparatus 200.

The parameter holding apparatus 400 acquires, from the machine learning apparatus 500, the parameter to be used in the controller of the motor control apparatus 200, and holds it. The parameter holding apparatus 400 further outputs the parameter held by the parameter holding apparatus 400 itself, to the switching determining apparatus 300.

The machine learning apparatus 500 adjusts the parameter to be used in each of the controllers of the motor control apparatus 200 by machine learning for each switching condition described above, and outputs the adjusted parameter to the parameter holding apparatus 400. The machine learning apparatus 500 includes a plurality of machine learning parts 510 corresponding to the switching conditions, respectively. It is noted that the following description is based on one example of the switching condition for switching the parameter on the basis of a plurality of pieces of preset position information (for example, position x=0, 0.1, 0.2 and so on (meters)). FIG. 1 shows the example in which, assuming that the range of the axis position is divided by a threshold value into n pieces and each divided range corresponds to each switching condition, the machine learning apparatus 500 includes n units of machine learning parts, specifically, a machine learning part 510_1, a machine learning part 510_2 to a machine learning part 510_n, on the basis of the above assumption. The motor control system and the motor control apparatus according to the present invention are described below in terms of their configurations, operations and the like, on the assumption that, for convenience of the description, the range of the axis position is divided into n pieces and the parameters are set in the motor control apparatus 200 so that the number of types of the parameters correspond to the number of the divided pieces.

The example of reinforcement learning is described below, as the machine learning according to the present embodiment. It is noted that the machine learning in the present invention is not limited to reinforcement learning, and the present invention is applicable to any other machine learning (for example, supervised learning).

Prior to the description of each functional block included in the machine learning apparatus 500, the basic mechanism of reinforcement learning is explained. An agent (corresponding to the machine learning apparatus 500 in the present embodiment) observes the state of an environment and selects a certain action, and the environment changes on the basis of the action. As the environment changes, some kind of reward is given, and the agent learns a better selection of an action (decision making). Supervised learning provides completely correct answers, whereas reinforcement learning provides rewards of a fragmentary value based on a change in a part of the environment, in many cases. Therefore, the agent learns to select an action so as to maximize the total future reward.

As described above, in the reinforcement learning, appropriate actions are learned through learning of actions on the basis of the mutual interaction given by the actions in the environment, that is, through a learning method of maximizing the future reward. This means that, in the present embodiment, action information for reducing position error is selected; that is, an action for influencing the future is acquired.

As the reinforcement learning, an arbitrary learning method is available. The following description is about an example case of Q-learning, which is a method of learning a value Q(s, a) for selecting an action a under a state s of a certain environment. The object of the Q-learning is to select, under the certain state s, the action a having the highest value Q(s, a) as the optimal action among the possible actions a.

However, at the time of initially starting the Q-learning, in terms of the combination of the state s and the action a, none of the correct values of the value Q(s, a) is known. Therefore, the agent selects various actions a under the certain state s and selects a better action on the basis of the reward given to the action a at that time, thereby learning the correct value Q(s, a).

The object to maximize the total future reward is set to finally satisfy the following equation: $Q(s, a)=E[\Sigma(\gamma^t)r_t]$. In the above equation, E[ ] denotes an expected value; t denotes time; γ denotes a parameter called a discount factor to be described below; $r_t$ denotes a reward at the time t; and Σ denotes a sum at the time t. The expected value in the equation corresponds to the expected value of the case where a state changes by the optimal action. Since the optimal action is unknown in the process of the Q-learning, the reinforcement learning is being performed while the optimal action is being searched through performing various actions. An update formula of such a value Q(s, a) is expressed by, for example, a formula 6 (hereinafter, referred to as Math. 6) as below.

[Math. 6]

$$Q(s_{t+1}, a_{t+1}) \leftarrow Q(s_t, a_t) + \alpha\left(r_{t+1} + \gamma\max_a Q(s_{t+1}, a) - Q(s_t, a_t)\right) \quad (6)$$

In the formula 6 above, $s_t$ denotes the state of the environment at the time t, and $a_t$ denotes the action at the time t. The action $a_t$ changes the state to $s_{t+1}$. In the formula 6, $r_{t+1}$ denotes the reward obtained by the change of the state. The term with "max" is obtained by multiplying, by γ, the value Q of the case where the action a having the highest value Q known at the time is selected under the state $s_{t+1}$. Herein, γ, which is called a discount factor, is a parameter of 0<γ≤1. Moreover, α, which is a learning rate, is set in the range of 0<α≤1.

The formula 6 described above denotes the method of updating the value $Q(s_t, a_t)$ of the action at in the state $s_t$ on the basis of the obtained reward $r_{t+1}$ as a result of the action $a_t$ performed. The update formula indicates that, when the value $\max_a Q(s_{t+1}, a)$ of the best action in the next state $s_{t+1}$ by the action $a_t$ is larger than the value $Q(s_t, a_t)$ of the action $a_t$ in the state $s_t$, the value $Q(s_t, a_t)$ is increased, while when the value $\max_a Q(s_{t+1}, a)$ is smaller than the value $Q(s_t, a_t)$, the value $Q(s_t, a_t)$ is decreased. That is, the value of a certain action in a certain state is brought closer to the value of the best action in the next state. Although such difference depends on the discount factor γ and the reward $r_{t+1}$, the value of the best action in a certain state basically in this system is propagated to the value of the action in the preceding state leading to the certain state.

As a method of Q-learning, learning can be performed after a table is prepared with respect to Q(s, a) for all of the state-action pairs (s, a). Since the number of states is too large to obtain the values of Q(s, a) for all of the state-action pairs, it may take much time for the Q-learning to converge, in some cases.

Therefore, a well-known technique called DQN (Deep Q-Network) may be used. Specifically, in an action-value function Q configured with an appropriate neural network, a parameter of the neural network may be adjusted, and a value function Q may be approximated by use of the appropriate neural network, thereby calculating the value Q(s, a). The use of DQN enables to shorten the time required for the Q-learning to converge. It is noted that DQN is disclosed in detail in the following non-patent document, as an example.

Non-Patent Document

"Human-level control through deep reinforcement learning," written by Volodymyr Mnih1 [online], [Searched on Jan. 17, 2017], on the following website:<URL: http://files.davidqiu.com/research/nature14236.pdf>

Figure 2:
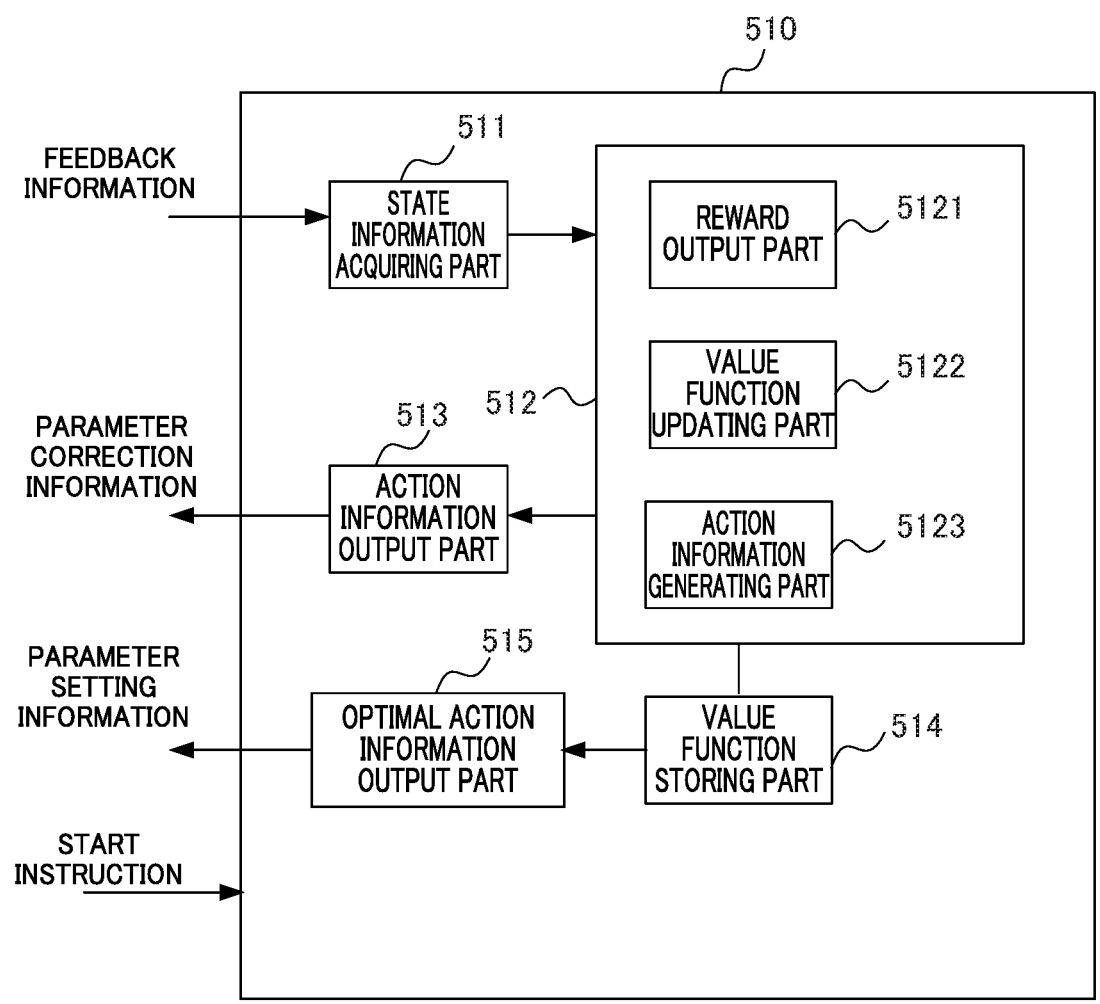
FIG. 2 is a block diagram illustrating the configuration of a machine learning part included in a machine learning apparatus according to the present invention.

The machine learning apparatus 500 performs the Q learning described above. FIG. 2 is a block diagram illustrating the functional blocks common to all the machine learning parts 510. The machine learning part 510 includes a state information acquiring part 511, a learning part 512, an action information output part 513, a value function storing part 514, and an optimal action information output part 515. The learning part 512 includes a reward output part 5121, a value function updating part 5122, and an action information generating part 5123.

The state information acquiring part 511 acquires, from the motor control apparatus 200, a state information S serving as feedback information such as on feedback and a command including the position error information of the motor control apparatus 200 acquired upon execution of the preset evaluation program, on the basis of the parameter to be used in the controller in the motor control apparatus 200. The state information S corresponds to an environmental state S in the Q-learning. The state information acquiring part 511 outputs the acquired state information S to the learning part 512. It is noted that reinforcement learning such as Q-learning will be described as reference in the last part of the present specifications.

The learning part 512 is the unit configured to learn the value Q(S, A) of the case where a certain action A is selected under an environment related to a certain state S. Herein, "action A" denotes specifically the action to adjust an optimal parameter with respect to the state S such as of feedback. The learning part 512 includes the reward output part 5121, the value function updating part 5122, and the action information generating part 5123.

The reward output part 5121 calculates a reward r of the case where the action A is selected under the state S, by use of a predetermined evaluation function on the basis of the state S. Herein, PD(S) denotes the set of the position error values (position error set) corresponding to state variables under the state S, and PD(S') denotes the position error set corresponding to state variables under the state S' changed from the state S by the action A. The value obtained through calculation based on a preset evaluation function f(PD(s)) serves as the value of the position error under the state S. Herein, "set of the position error values" refers to the set of position error values obtained through calculation in the axis position range divided into n pieces as described above.

The examples of "evaluation function f" include: a function for calculating an integrated value of absolute values of position error, expressed by $$\int |e| dt;$$

a function for calculating an integrated value by weighting absolute values of position error with time, expressed by $$\int t|e| dt;$$

a function for calculating an integrated value of 2n (n is a natural number) raised to absolute values of position error, expressed by $$\int e^{2n} dt \ (n \text{ is a natural number}); \text{ and}$$

a function for calculating the maximum value of absolute values of position error, expressed by Max $\{|e|\}$. The present invention is not limited thereto.

Herein, "reward r" is set as follows. A negative value is set as a reward value, in the case where the state S is corrected into the state S' by the action A, and where the position error value under the state S' is larger than the position error value under the state S prior to the correction by the action A.

On the other hand, a positive value is set as a reward value, in the case where the position error value under the state information S' corrected by the action A is smaller than the position error value under the state S prior to the correction by the action A.

The value function updating part 5122 performs the Q-learning on the basis of the state S, the action A, the state S' obtained in the case of the action A applied to the state S, and the reward value r, thereby updating the action-value function Q stored by the value function storing part 514. It is noted that in the case of re-learning of one or more parameter(s), the parameter held by the parameter holding apparatus 400 may be set as a default value at the start of the Q-learning.

The action information generating part 5123 selects the action A for the process of the Q-learning with respect to the current state S. The action information generating part 5123 generates an action information A so that the action (corresponding to the action A in the Q-learning) to correct the parameter to be used in the controller of the motor control apparatus 200 is performed in the process of the Q-learning, and outputs the generated action information A to the action information output part 513. More specifically, in an example, the action information generating part 5123 outputs, to the action information output part 513, the action A to increase or decrease the parameter included in the state S to be used in a controller in an incremental manner (for example, approx. 0.01). The action information A serves as parameter correction information.

In the case where the state is shifted to the state S' when the parameter to be used in a controller is increased or decreased, and then a positive reward (a reward having a positive value) is returned, the action information generating part 5123 may take, as the next action information A', a measure to select the action A' to decrease the position error value, such as by increasing or decreasing the parameter to be used in a controller in an incremental manner as in the previous action.

Conversely, in the case where a negative reward (a reward having a negative value) is returned, the action information generating part 5123 may take, as the next action A', a measure to select the action A' to decrease the position error value compared to the previous value, such as by decreasing or increasing, reversely to the previous action, the parameter to be used in a controller in an incremental manner.

The action information output part 513 is a unit configured to transmit parameter correction information serving as the action information A output by the learning part 512 to a controller of the motor control apparatus 200. As described above, the motor control apparatus 200 finely adjusts the current state S, that is, the currently-set parameter for a controller on the basis of the action information A, whereby the state S is shifted to the next state S' (that is, the corrected parameter).

The value function storing part 514 is a storage device configured to store the value function Q. In an example, the value function Q may be stored as a table (hereinafter, referred to as an action-value table) for each of the state S and the action A. The value function Q stored by the value function storing part 514 is updated by the value function updating part 5122.

The optimal action information output part 515 generates an action information a (hereinafter, referred to as "optimal action information") for making the motor control apparatus 200 perform an action allowing to maximize the value Q(s, a), on the basis of the value function Q updated through the Q-learning performed by the value function updating part 5122.

More specifically, the optimal action information output part 515 acquires the value function Q stored by the value function storing part 514. The value function Q has been updated through the Q-learning performed by the value function updating part 5122, as described above. The optimal action information output part 515 generates the action information on the basis of the value function Q, and outputs the generated action information to the parameter holding apparatus 400.

As described above, the parameter holding apparatus 400 holds the parameters, which are to be used in the controllers of the motor control apparatus 200, and have been adjusted through the machine learning by the machine learning apparatus 500. The motor control apparatus 200 is able to operate to reduce a position error value by using one or more parameter(s) held by the parameter holding apparatus 400.

As described above, the machine learning apparatus 500 according to the present invention includes the plurality of machine learning parts 510 respectively corresponding to switching conditions, and is thereby able to adjust the parameters to be used in the controllers of the motor control apparatus 200 by machine learning, for respective switching conditions.

Each of the machine learning parts 510_1, 510_2 to 510_n performs machine learning, so as to correspond to each of n pieces of the divided ranges of the axis position. The machine learning by the machine learning apparatus 500 as a whole is distributed to each of the machine learning parts 510_1, 510_2 to 510_n by the following method.

In the case where the range of the axis position is divided into n pieces as in $x_0(=0) \leq x < x_1$, $x_1 \leq x < x_2$ to $X_{n-1} \leq x < x_n$, and where the feedback information acquired by the machine learning apparatus 500 from the motor control apparatus 200 includes the axis position information indicating that the axis position is in the range of $x_0(=0) \leq x < x_1$, the machine learning apparatus 500 determines that the feedback information is to be learned by the machine learning part 510_1. Specifically, in the case where the axis position based on the current axis position information during the operation of an evaluation machining program is in the above-described range of $x_0(=0) \leq x < x_1$, the machine learning apparatus 500 determines that the feedback information is to be learned by the machine learning part 510_1.

In the case where the feedback information acquired by the machine learning apparatus 500 from the motor control apparatus 200 includes the axis position information indicating that the axis position is in the range of $x_1 \leq x < x_2$, the machine learning apparatus 500 determines that the feedback information is to be learned by the machine learning part 510_2. Specifically, in the case where the axis position based on the current axis position information during the operation of the evaluation machining program is in the above-described range of $x_1 \leq x < x_2$, the machine learning apparatus 500 determines that the feedback information is to be learned by the machine learning part 510_2.

Similarly, in the case where the feedback information acquired by the machine learning apparatus 500 from the motor control apparatus 200 includes the axis position information indicating that the axis position is in the range of $x_{i-1} \leq x < x_i$ ($1 \leq i \leq n$), the machine learning apparatus 500 determines that the feedback information is to be learned by the machine learning part 510_i. Specifically, in the case where the axis position is in the above-described range of $x_{i-1} \leq x < x_i$, the machine learning apparatus 500 determines that the feedback information is to be learned by the machine learning part 510_i.

It is noted that the evaluation machining program is set to cover the range of $x_0 \leq x < x_n$. Thereby, parameters are generated so as to correspond to all the sections of $x_0(=0) \leq x < x_1$, $x_1 \leq x < x_2$ to $x_{n-1} \leq x < x_n$.

After the machine learning, the optimal action information output part 515 of the machine learning part 510_1 outputs the switching condition indicating that, when the axis position is in the range of $x_0(=0) \leq x < x_1$, the controller uses the parameter generated by the machine learning part 510_1, together with the parameter to the parameter holding apparatus 400. The optimal action information output part 515 of the machine learning part 510_2 outputs the switching condition indicating that, when the axis position is in the range of $x_1 \leq x < x_2$, the controller uses the parameter generated by the machine learning part 510_2, together with the parameter to the parameter holding apparatus 400. Similarly, the optimal action information output part 515 of the machine learning part 510_i ($1 \leq i \leq n$) outputs the switching condition indicating that when the axis position is in the range of $x_{i-1} \leq x < x_i$, the controller uses the parameter generated by the machine learning part 510_i, together with the parameter to the parameter holding apparatus 400.

[1.2 Motor Control Apparatus]

Figure 3:
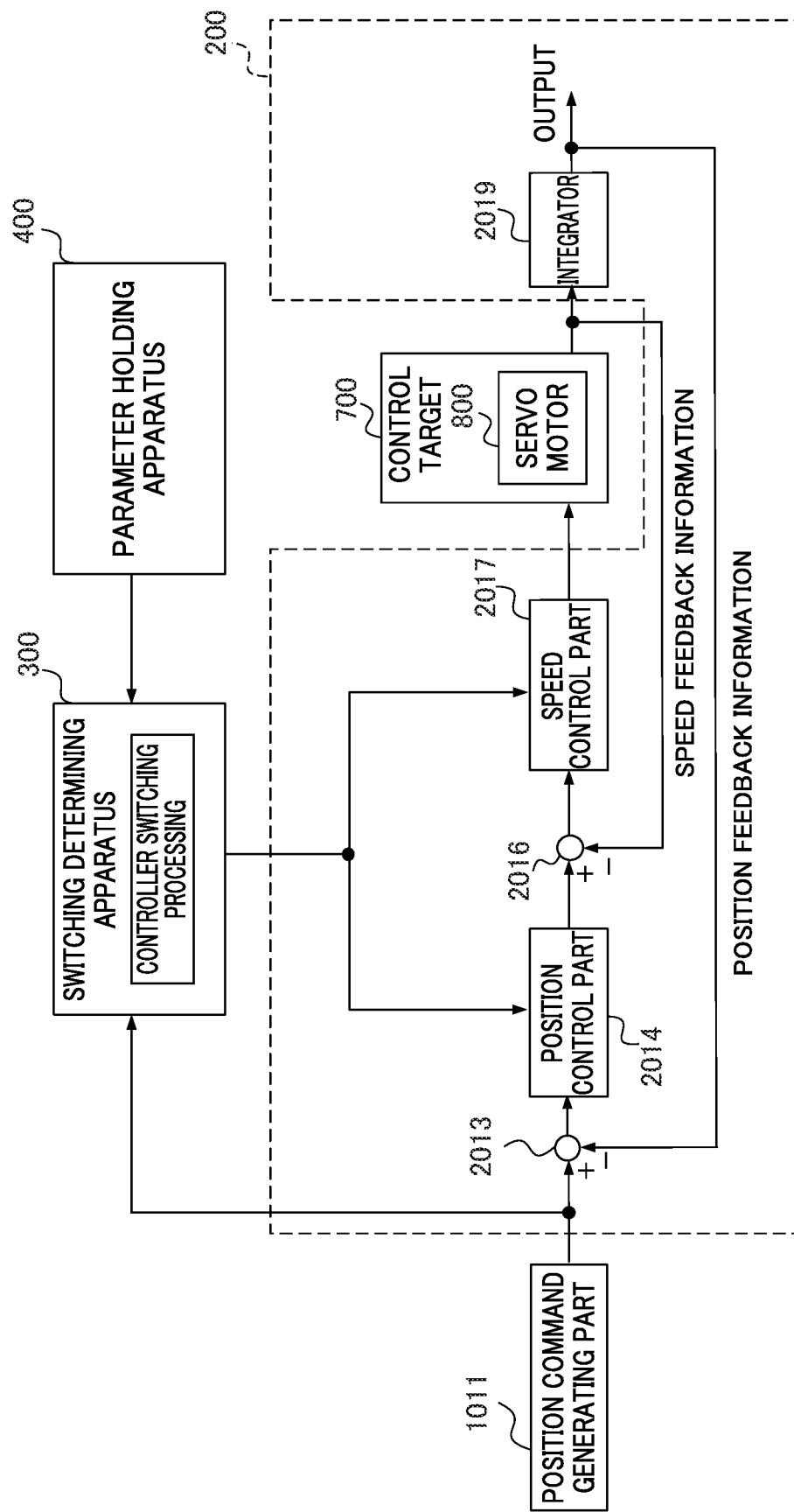
FIG. 3 is a block diagram illustrating the overall configuration of the motor control apparatus according to a first embodiment of the present invention.

FIG. 3 is a block diagram illustrating one configuration example of the motor control apparatus 200. For convenience of the description, FIG. 3 further shows a position command generating part 1011 included in the CNC apparatus 100, the switching determining apparatus 300 and the parameter holding apparatus 400. It is noted that the position command generating part 1011 of the CNC apparatus 100 is a functional block configured to generate a position command value on the basis of a machining program.

As shown in FIG. 3, the motor control apparatus 200 includes a subtracter 2013, a position control part 2014, a subtracter 2016, a speed control part 2017, and an integrator 2019. Each component of the motor control apparatus 200 is provided for each spindle motor or each servo motor.

The subtracter 2013 acquires the position command value from the CNC apparatus 100 (the position command generating part 1011), calculates a difference between the position command value and the detection position fed back for position, and outputs the difference as position error to the position control part 2014.

The position control part 2014 outputs, to the subtracter 2016 as a speed command value, a value obtained by multiplying the position error by a position gain KP.

Figure 4A:
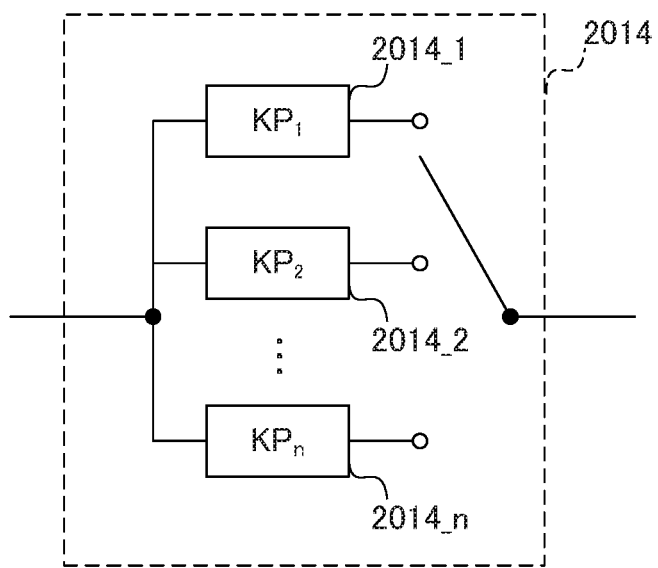
FIG. 4A is a block diagram illustrating the configuration of a position control part included in the motor control apparatus according to the first embodiment of the present invention.

FIG. 4A shows the configuration of the position control part 2014. The position control part 2014 includes a position control part 2014_1, a position control part 2014_2 to a position control part 2014_n. The position control part 2014_1 outputs, to the subtracter 2016, a value obtained by multiplying the position error by a position gain $KP_1$, as a speed command value. The position control part 2014_2 outputs, to the subtracter 2016, a value obtained by multiplying the position error by a position gain $KP_2$, as a speed command value. The position control part 2014_n outputs, to the subtracter 2016, a value obtained by multiplying the position error by a position gain $KP_n$, as a speed command value.

These position gains $KP_1$, $KP_2$ to $KP_n$ are the parameters adjusted by the machine learning parts 510_1, 501_2 to 510_n of the machine learning apparatus 500, respectively. These parameters are output by the machine learning apparatus 500 to the parameter holding apparatus 400, output by the parameter holding apparatus 400 to the switching determining apparatus 300, and output by the switching determining apparatus 300 to the position control parts 2014_1, 2014_2 to 2014_n, respectively.

It is noted that once the parameters adjusted by the machine learning apparatus 500 are set to the position control parts 2014_1, 2014_2 to 2014_n, the set parameters are not to be changed during the actual machining performed by a machine tool, a robot or an industrial machine.

As described below, the switching determining apparatus 300 determines the switching condition on the basis of the axis position information, and outputs, to the motor control apparatus 200 as the switching information corresponding to the determination result, the information indicating that which one of the position control parts 2014_1, 2014_2 to 2014_n is to be used as the position control part 2014 of the motor control apparatus 200. Thereby, in the motor control apparatus 200, the position control part 2014 is switched to one of the position control parts 2014_1, 2014_2 to 2014_n.

The subtracter 2016 calculates a difference between the output of the position control part 2014 and a speed detection value in speed feedback information, and outputs the difference as speed error to the speed control part 2017.

The speed control part 2017 adds the value obtained by multiplying the speed error by a proportional gain KV and the integral value obtained by multiplying the speed error by an integral gain Kiv, and outputs the resultant value as a torque command value to the servo motor 800.

Figure 4B:
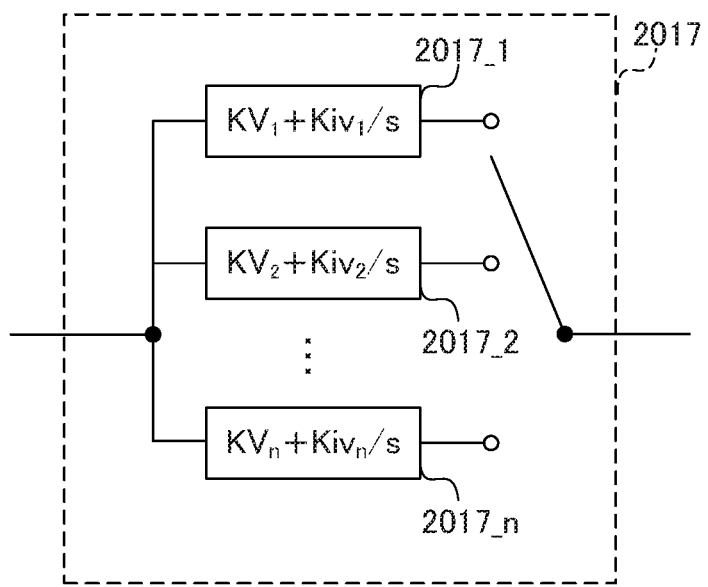
FIG. 4B is a block diagram illustrating the configuration of a speed control part included in the motor control apparatus according to the first embodiment of the present invention.

FIG. 4B shows the configuration of the speed control part 2017. The speed control part 2017 includes a speed control part 2017_1, a speed control part 2017_2 to a speed control part 2017_n. The speed control part 2017_1 adds the value obtained by multiplying the speed error by a proportional gain $KV_1$ and the integral value obtained by multiplying the speed error by an integral gain $Kiv_1$, and outputs the resultant value as a torque command value to the servo motor 800. The speed control part 2017_2 adds the value obtained by multiplying the speed error by a proportional gain $KV_2$ and the integral value obtained by multiplying the speed error by an integral gain $Kiv_2$, and outputs the resultant value as a torque command value to the servo motor 800. The speed control part 2017_n adds the value obtained by multiplying the speed error by a proportional gain $KV_n$ and the integral value obtained by multiplying the speed error by an integral gain $Kiv_n$, and outputs the resultant value as a torque command value to the servo motor 800.

These proportional gains $KV_1$, $KV_2$ to $KV_n$ are the parameters adjusted by the machine learning parts 510_1, 510_2 to 510_n of the machine learning apparatus 500, respectively. Similarly, the integral gains $Kiv_1$, $Kiv_2$ to $Kiv_n$ are the parameters adjusted by the machine learning parts 510_1, 510_2 to 510_n of the machine learning apparatus 500, respectively. These parameters are output by the machine learning apparatus 500 to the parameter holding apparatus 400, output by the parameter holding apparatus 400 to the switching determining apparatus 300, and output by the switching determining apparatus 300 to the speed control parts 2017_1, 2017_2 to 2017_n, respectively.

It is noted that once the parameters adjusted by the machine learning apparatus 500 are set to the speed control parts 2017_1, 2017_2 to 2017_n, the set parameters are not to be changed during the actual machining performed by a machine tool, a robot, or an industrial machine.

As described below, the switching determining apparatus 300 determines the switching condition on the basis of the axis position information, and outputs, to the motor control apparatus 200 as the switching information corresponding to the determination result, the information indicating that which one of the speed control parts 2017_1, 2017_2 to 2017_n is to be used as the speed control part 2017 of the motor control apparatus 200. Thereby, in the motor control apparatus 200, the speed control part 2017 is switched to one of the speed control parts 2017_1, 2017_2 to 2017_n.

It is noted that the machine learning apparatus 500 adjusts both of the parameters to be used in the position control part 2014 and the parameters to be used in the speed control part 2017, as described above, or alternatively the machine learning apparatus 500 may adjust only one of the parameters.

Figure 10:
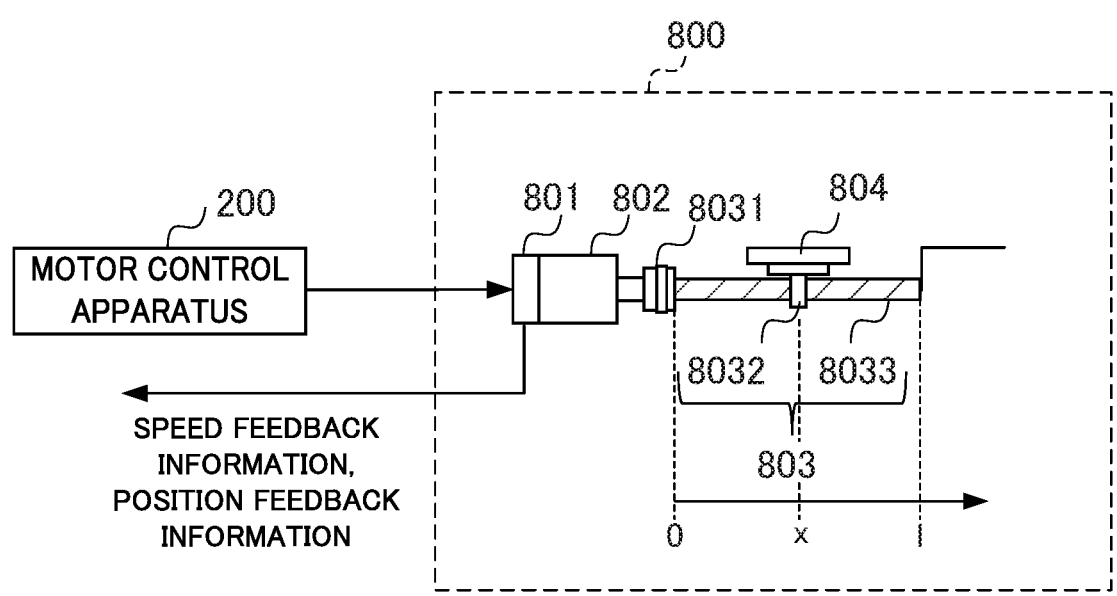
FIG. 10 is a block diagram partially illustrating a machine tool including a servo motor, which is one example of a control target of a motor control apparatus.

FIG. 10 is a block diagram partially illustrating a machine tool including the servo motor 800, which is one example of a control target 700 of the motor control apparatus 200. The motor control apparatus 200 moves the table 804 via a coupling mechanism 803 by the servo motor 800, to machine a workpiece (work) mounted on the table 804. The coupling mechanism 803 has the coupling 8031 connected to the servo motor 800, and the ball screw 8033 fixed to the coupling 8031, and the nut 8032 screwed to the ball screw 8033. Upon the rotational driving of the servo motor 800, the nut 8032 screwed to the ball screw 8033 moves in the axial direction of the ball screw 8033. The table 804 moves, as the nut 8032 moves.

The rotational angle position of the servo motor 800 serving as the control target 700 is detected by a rotary encoder 801, which is related to the servo motor 800 and serves as a position detecting part. The detected signal is used as the speed detection value to be fed back for speed. The speed detection value is subjected to integration by the integrator 2019, and the resultant value is used as a position detection value to be fed back for position. Alternatively, in the case of the servo motor 800 including a linear scale, the position feedback value by the linear scale, instead of the integral value of the speed detection values by the integrator 2019, is used as the position detection value. The motor control apparatus 200 is configured as described above.

[1.3 Relation of Axis Position to Resonance Frequency and Rigidity]

As described above, since the transmission characteristics from torque to a position vary depending on the axis position, the parameter in, for example, a feedback controller or a feedforward controller is adjusted for each axis position by machine learning, and the parameter is switched depending on the axis position, thereby enabling to exhibit high performance in control. That is, since the rigidity, resonance frequency and anti-resonance frequency of a machine tool, a robot or an industrial machine vary depending on the axis position, the parameter thereof is to be adjusted for each axis position in order to exhibit high performance in control, and the parameter or the controller using the parameter is to be switched depending on the switching conditions relevant to the axis position. The description below is about the operation by the switching determining apparatus 300 in FIG. 3, of switching the position control part 2014 and the speed control part 2017 depending on the axis position information acquired from the motor control apparatus 200. It is noted that one example is described below, in which the parameter is switched on the basis of a plurality of pieces of preset position information (for example, positions $x_i$=0, 0.1, 0.2 and so on (meters)).

[1.4 Operation by Switching Determining Apparatus]

Figure 5:
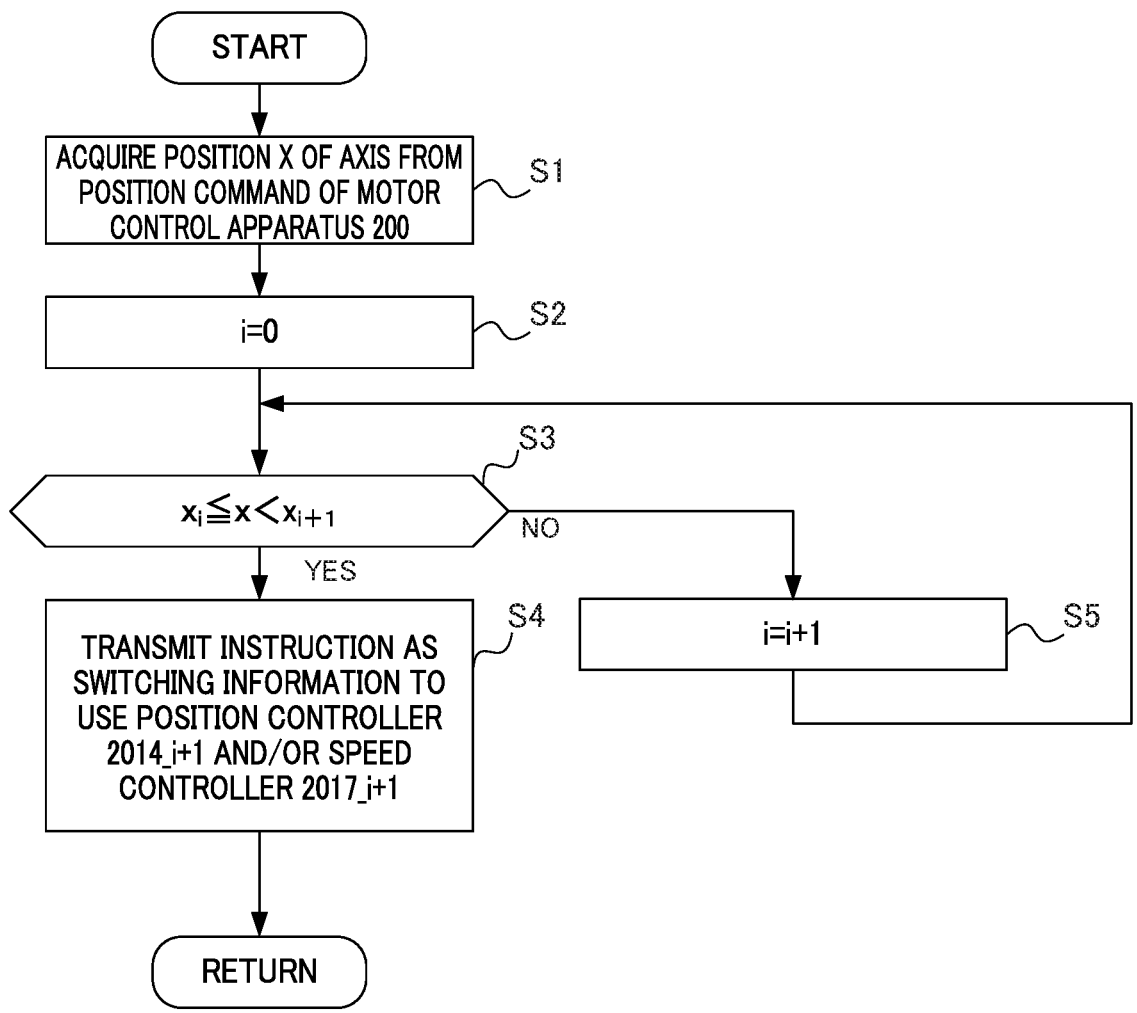
FIG. 5 is a flowchart indicating the operation of a switching determining apparatus included in the first embodiment of the present invention.

FIG. 5 is a flowchart indicating one example of the operation in controller switching processing by the switching determining apparatus 300.

In step S1, the switching determining apparatus 300 acquires a position x of the axis from the motor control apparatus 200.

In step S2, i=0($x_0$=0) is set as a default value.

In step S3, in the case where the position x of the axis is a threshold value $x_i$ or greater, and lower than a threshold value $x_{i+1}$ (S3: YES), the processing proceeds to step S4. In the case where the position x of the axis exceeds the threshold value $x_{i+1}$ (S3: NO), the processing proceeds to step S5.

In step S4, the switching determining apparatus 300 outputs, to the motor control apparatus 200, the switching information indicating that a position control part 2014_i+1 is to be used as the position control part 2014 and/or the switching information indicating that a speed control part 2017_i+1 is to be used as the speed control part 2017. More specifically, in the case where the machine learning apparatus 500 adjusts the parameters for the position control part 2014 and where the position control part 2014 includes n units of controllers of the position control parts 2014_1, 2014_2 to 2014_n, the switching determining apparatus 300 outputs, to the motor control apparatus 200, the switching information indicating that the position control part 2014_i+1 is to be used as the position control part 2014. In the case where the machine learning apparatus 500 adjusts the parameters for the speed control part 2017 and where the speed control part 2017 includes n units of controllers of the speed control parts 2017_1, 2017_2 to 2017_n, the switching determining apparatus 300 outputs, to the motor control apparatus 200, the switching information indicating that the speed control part 2017_i+1 is to be used as the speed control part 2017. Thereafter, the processing returns to step S1 (return).

In step S5, 1 is added to i. Thereafter, the processing returns to step S3.

It is noted that once the position control part 2014 and the speed control part 2017 to be used during the operation of the motor control apparatus 200 are determined according to the flow described above, the position control part 2014 and the speed control part 2017 are not to be changed basically during the actual machining performed by a machine tool, a robot or an industrial machine. This enables to avoid variation in quality of machining by a machine tool, a robot or an industrial machine.

2 Second Embodiment

Figure 6:
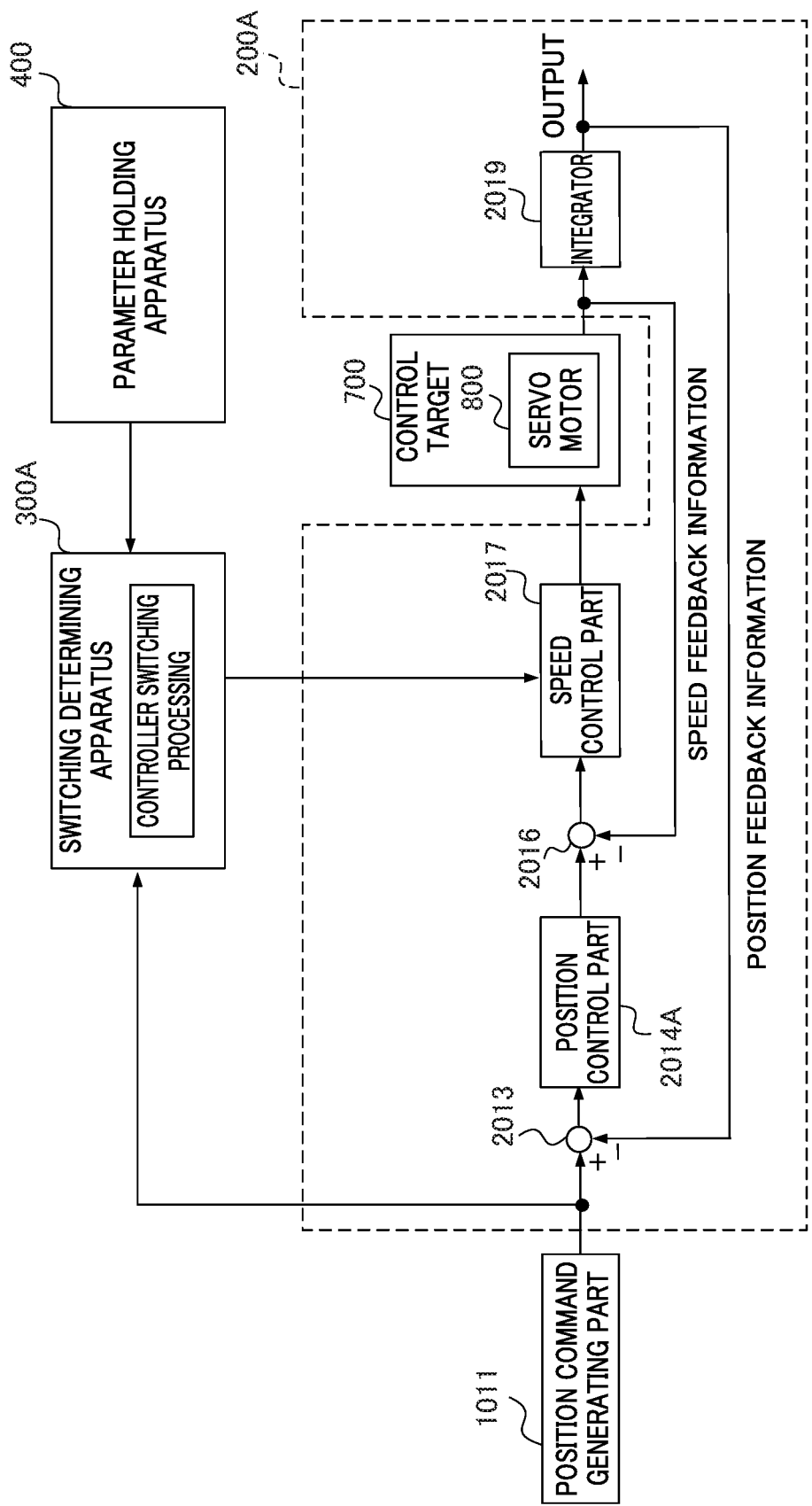
FIG. 6 is a block diagram illustrating the overall configuration of a motor control apparatus according to a second embodiment of the present invention.

FIG. 6 is a block diagram illustrating one configuration example of a motor control apparatus 200A in a motor control system 10A according to the second embodiment. For convenience of the description, the motor control system 10A and the motor control apparatus 200A are described below in terms of the differences from the motor control system 10 and the motor control apparatus 200, respectively, and the descriptions of the same configurations are omitted.

In the motor control apparatus 200 according to the first embodiment, the position control part 2014 includes the plurality of position control parts such as the position control parts 2014_1, 2014_2 to 2014_n, and the speed control part 2017 includes the plurality of speed control parts such as the speed control parts 2017_1, 2017_2 to 2017_n. With this configuration, in the motor control system 10, depending on the switching conditions based on the axis position information, the switching determining apparatus 300 switches the controller among the position control parts 2014_1, 2014_2 to 2014_n, and further switches the controller among the speed control parts 2017_1, 2017_2 to 2017_n.

On the other hand, in the motor control apparatus 200A according to the present embodiment, although the speed control part 2017 includes the plurality of speed control parts such as the speed control parts 2017_1, 2017_2 to 2017_n, a position control part 2014A does not include a plurality of position control parts. With this configuration, in the motor control system 10A, the machine learning apparatus 500 adjusts one or more parameter(s) for the speed control part 2017 for each switching condition, and does not adjust any parameter for the position control part 2014A. A switching determining apparatus 300A switches the controller among the speed control parts 2017_1, 20172 to 2017_n depending on the switching conditions based on the axis position information, and does not switch the controller of the position control part 2014A.

3 Third Embodiment

Figure 7:
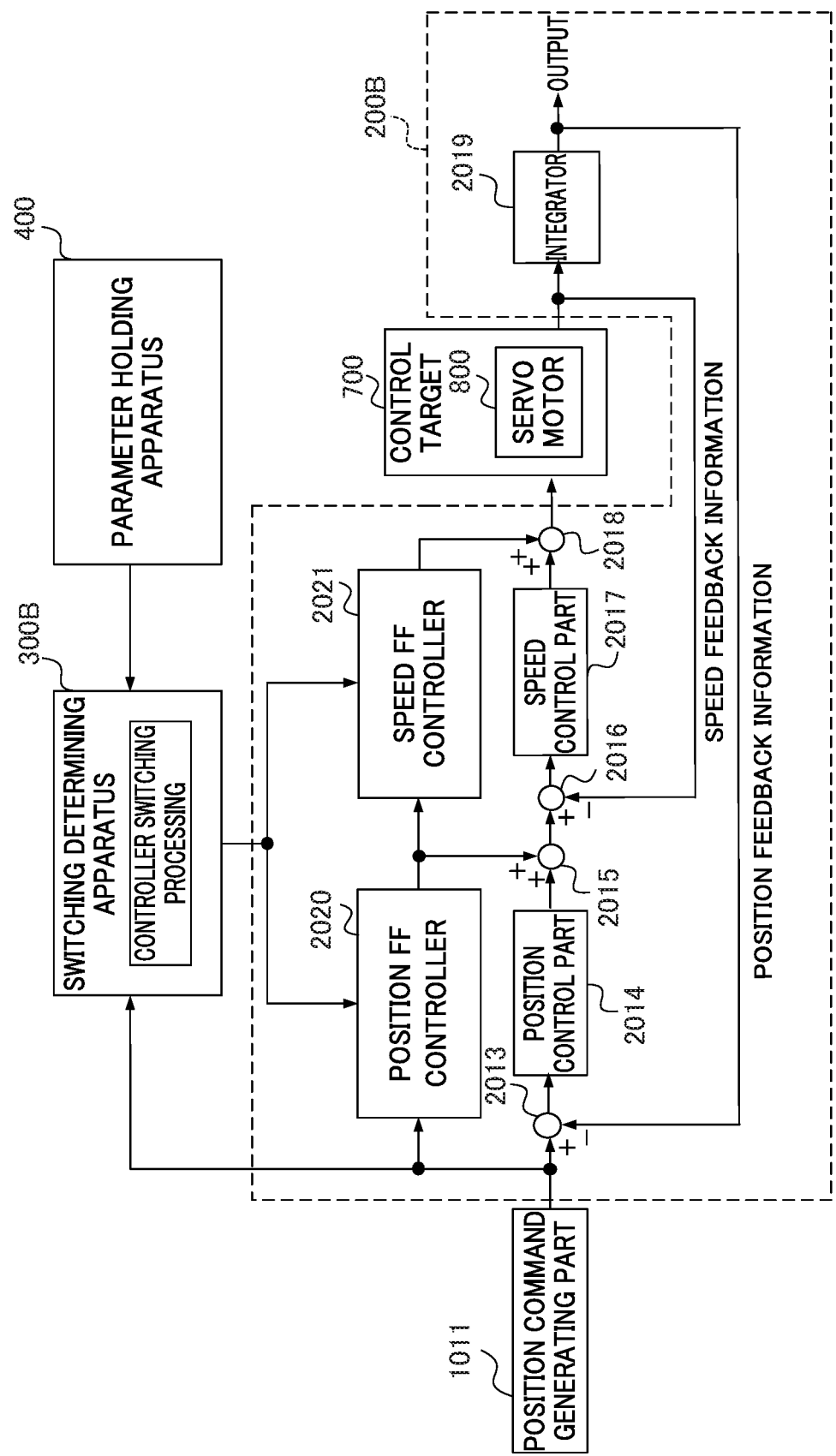
FIG. 7 is a block diagram illustrating the overall configuration of a motor control apparatus according to a third embodiment of the present invention.

FIG. 7 is a block diagram illustrating one configuration example of a motor control apparatus 200B in a motor control system 10B according to the third embodiment. For convenience of the description, the motor control system 10B and the motor control apparatus 200B are described below in terms of the differences from the motor control system 10 and the motor control apparatus 200, respectively, and the descriptions of the same configurations are omitted.

The motor control apparatus 200B includes a position feedforward control part 2020 and a speed feedforward control part 2021, in addition to the components included in the motor control apparatus 200.

The position feedforward control part 2020 performs the position feedforward calculation processing expressed by a transfer function Ff(s) in a formula (7) (hereinafter, referred to as Math. 7), and outputs the resultant value to an adder 2015.

[Math. 7]

$$Ff(s) = \frac{b_{10} + b_{11}s + b_{12}s^2 + \ldots}{a_{10} + a_{11}s + a_{12}s^2 + \ldots} \quad (7)$$

Figure 8A:
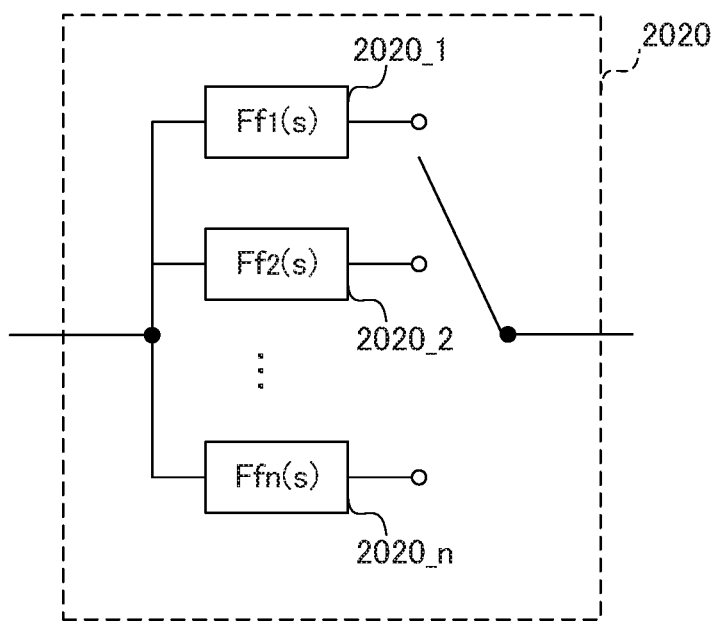
FIG. 8A is a block diagram illustrating the configuration of a position feedforward control part included in the motor control apparatus according to the third embodiment of the present invention.

FIG. 8A shows the configuration of the position feedforward control part 2020. The position feedforward control part 2020 includes n units of controllers such as a position feedforward control part 2020_1, a position feedforward control part 2020_2 to a position feedforward control part 2020_n. The position feedforward control part 2020_1 performs the position feedforward calculation processing expressed by $Ff_1(s)$ as the transfer function Ff(s), and outputs the resultant value to the adder 2015. The position feedforward control part 2020_2 performs the position feedforward calculation processing expressed by $Ff_2(s)$ as the transfer function Ff(s), and outputs the resultant value to the adder 2015. The position feedforward control part 2020_n performs the position feedforward calculation processing expressed by $Ff_n(s)$ as the transfer function Ff(s), and outputs the resultant value to the adder 2015.

The coefficients in these transfer functions $Ff_1(s)$, $Ff_2(s)$ to $Ff_n(s)$ are the parameters adjusted by the machine learning parts 510_1, 510_2 to 510_n of the machine learning apparatus 500, respectively. These parameters are output by the machine learning apparatus 500 to the parameter holding apparatus 400, output by the parameter holding apparatus 400 to the switching determining apparatus 300, and output by the switching determining apparatus 300 to the position feedforward control parts 2020_1, 2020_2 to 2020_$n$, respectively.

A switching determining apparatus 300B determines the switching condition on the basis of the axis position information, and outputs, to the motor control apparatus 200B as the switching information corresponding to the switching condition serving as the determination result, the information indicating that which one of the position feedforward control parts 2020_1, 2020_2 to 2020_$n$ is to be used as the position feedforward control part 2020 of the motor control apparatus 200B. Thereby, in the motor control apparatus 200B, the position feedforward control part 2020 is switched to one of the position feedforward control parts 2020_1, 2020_2 to 2020_$n$.

It is noted that once the parameters adjusted by the machine learning apparatus 500 are set to the position feedforward control parts 2020_1, 2020_2 to 2020_$n$, the set parameters are not to be changed during the actual machining performed by a machine tool, a robot, or an industrial machine. The speed feedforward control part 2021 performs the speed feedforward calculation processing expressed by a transfer function Gf(s) in a formula (8) (hereinafter, referred to as Math. 8), and outputs the resultant value to an adder 2018.

[Math. 8]

$$Gf(s) = \frac{b_{20} + b_{21}s + b_{22}s^2 + \ldots}{a_{20} + a_{21}s + a_{22}s^2 + \ldots} \qquad (8)$$

Figure 8B:
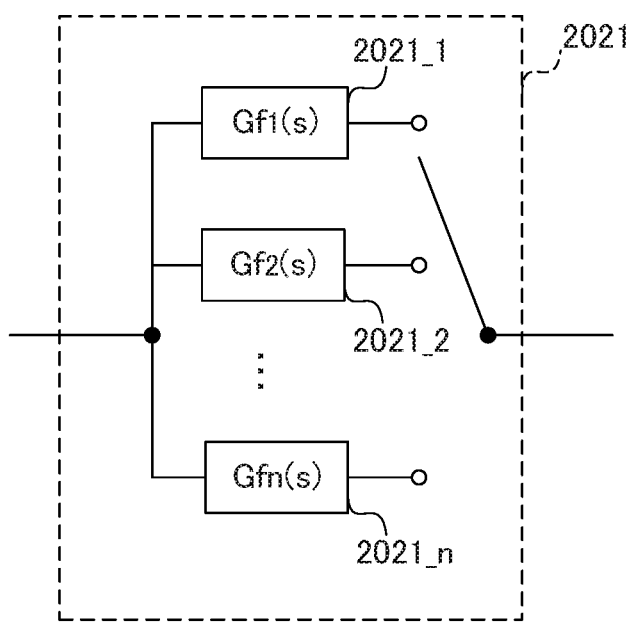
FIG. 8B is a block diagram illustrating the configuration of a speed feedforward control part included in the motor control apparatus according to the third embodiment of the present invention.

FIG. 8B shows the configuration of the speed feedforward control part 2021. The speed feedforward control part 2021 includes a speed feedforward control part 2021_1, a speed feedforward control part 2021_2 to a speed feedforward control part 2021_$n$. The speed feedforward control part 2021_1 performs the speed feedforward calculation processing expressed by Gf$_1$(s) as the transfer function Gf(s), and outputs the resultant value to the adder 2018. The speed feedforward control part 2021_2 performs the speed feedforward calculation processing expressed by Gf$_2$(s) as the transfer function Gf(s), and outputs the resultant value to the adder 2018. The speed feedforward control part 2021_$n$ performs the speed feedforward calculation processing expressed by Gf$_n$(s) as the transfer function Gf(s), and outputs the resultant value to the adder 2018.

The coefficients in these transfer functions Gf$_1$(s), Gf$_2$(s) to Gf$_n$(s) are the parameters adjusted by the machine learning parts 510_1, 510_2 to 510_$n$ of the machine learning apparatus 500, respectively. These parameters are output by the machine learning apparatus 500 to the parameter holding apparatus 400, output by the parameter holding apparatus 400 to the switching determining apparatus 300, and output by the switching determining apparatus 300 to the speed feedforward control parts 2021_1, 2021_2 to 2021_$n$, respectively.

It is noted that once the parameters adjusted by the machine learning apparatus 500 are set to the speed feedforward control parts 2021_1, 2021_2 to 2021_$n$, the set parameters are not to be changed during the actual machining performed by a machine tool, a robot, or an industrial machine.

The switching determining apparatus 300B determines the switching condition on the basis of the axis position information, and outputs, to the motor control apparatus 200B as the switching information corresponding to the determination result, the information indicating that which one of the speed feedforward control parts 2021_1, 2021_2 to 2021_$n$ is to be used as the speed feedforward control part 2021 of the motor control apparatus 200. Thereby, in the motor control apparatus 200B, the speed feedforward control part 2021 is switched to one of the speed feedforward control parts 2021_1, 2021_2 to 2021_$n$.

It is noted that the machine learning apparatus 500 may adjust both of the parameters to be used in the position feedforward control part 2020 and the parameters to be used in the speed feedforward control part 2021, or may adjust only one of the two.

The switching determining apparatus 300B may switch both of the controllers, with respect to the controller among the position feedforward control parts 2020_1, 2020_2 to 2020_$n$, and the controller among the speed feedforward control parts 2021_1, 2021_2 to 2021_$n$, or may switch only one of the two.

4 Fourth Embodiment

Figure 9:
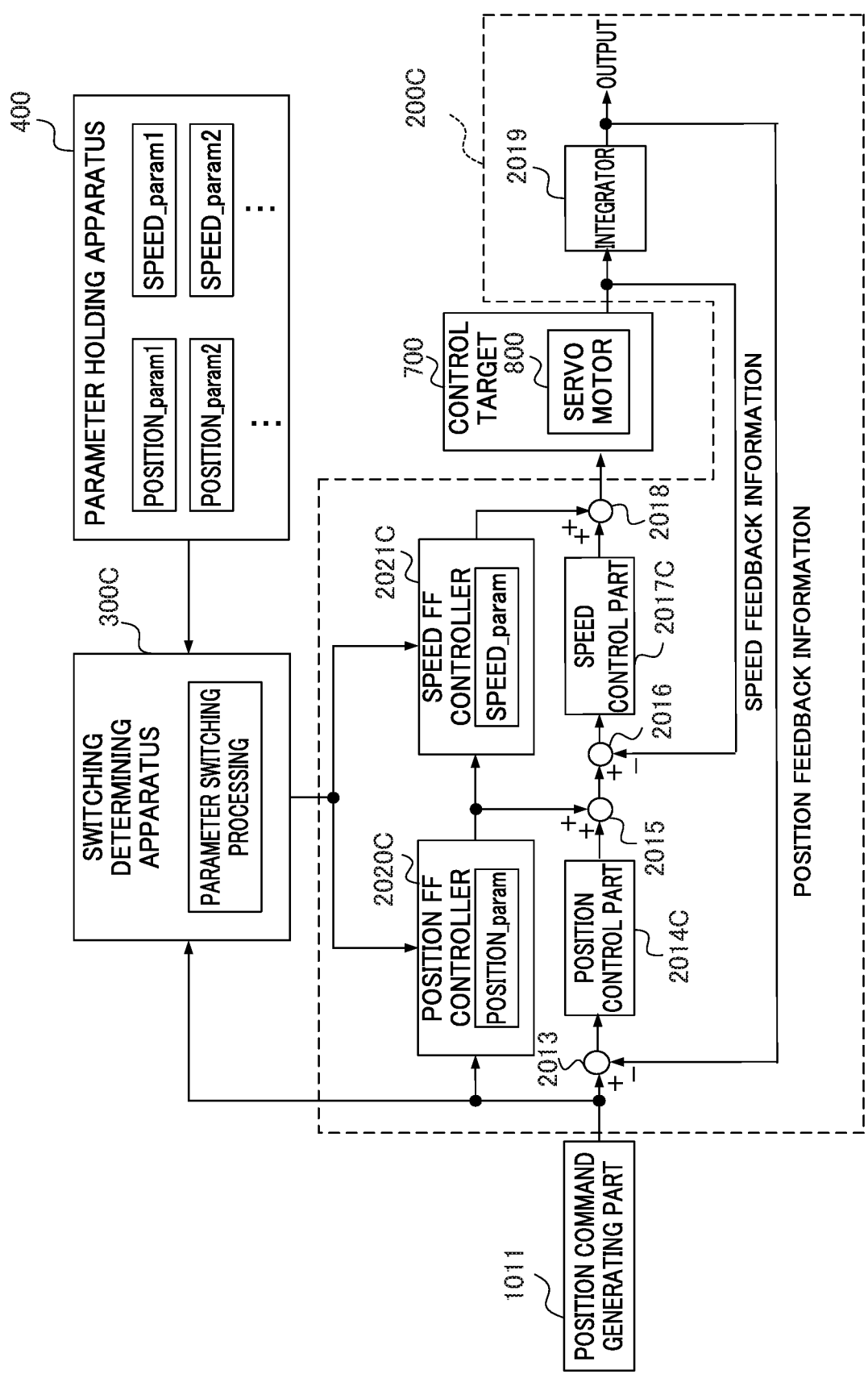
FIG. 9 is a block diagram illustrating the overall configuration of a motor control apparatus according to a fourth embodiment of the present invention.

FIG. 9 is a block diagram illustrating one configuration example of a motor control apparatus 200C in a motor control system 10C according to the fourth embodiment. For convenience of the description, the motor control system 10C and the motor control apparatus 200C are described below in terms of the differences from the motor control system 10 and the motor control apparatus 200, and the descriptions of the same configurations are omitted.

In each of the motor control systems 10 to 10B, the machine learning apparatus 500 adjusts one or more parameter(s) for each controller depending on each switching condition, and each adjusted parameter is set to each of the plurality of control parts included in the position control part 2014, the speed control part 2017, the position feedforward control part 2020 and the speed feedforward control part 2021. Thereafter, each of the switching determining apparatuses 300 to 300B determines a switching condition on the basis of the axis position information, and outputs, to each of the motor control apparatuses 200 to 200B, the switching information indicating that the controller corresponding to the determination result is to be selected among the plurality of control parts.

On the other hand, in the motor control apparatus 200C according to the fourth embodiment, each of a position control part 2014C, a speed control part 2017C, a position feedforward control part 2020C, and a speed feedforward control part 2021C includes one control part. A switching determining apparatus 300C determines a switching condition on the basis of the axis position information, selects one or more parameter(s) for each controller corresponding to the determination result from among a plurality of parameters, and sets the parameter to each of the position control part 2014C, the speed control part 2017C, the position feedforward control part 2020C and the speed feedforward control part 2021C.

FIG. 9 shows one aspect in which the switching determining apparatus 300C selects the parameters to be used in the position feedforward control part 2020C and the speed feedforward control part 2021C, and the respective parameters are set to the position feedforward control part 2020C and the speed feedforward control part 2021C. It is noted that the present invention is not limited thereto. The switching determining apparatus 300C may select one or more parameter(s) to be used in an arbitrary control part among the position control part 2014C, the speed control part 2017C, the position feedforward control part 2020C, and the speed feedforward control part 2021C, and may set the parameter in the control part.

5 Modifications

[5.1 Modification 1]

In each of the above-described embodiments, the machine learning apparatus 500 is configured to adjust one parameter or one set of parameters for one switching condition, and set the one parameter or the one set of parameters to each control part. The present invention is not limited thereto. In an example, a plurality of types of parameters may be adjusted for one switching condition depending on the degree in quality of the machining performed by a machine tool, a robot or an industrial machine, and the parameter holding apparatus 400 may hold the plurality of types of parameters. In this case, in an example, each of the switching determining apparatuses 300 to 300C may be configured with a display apparatus (not shown) configured to display the plurality of types of parameters, so that a user selects an arbitrary parameter through the input part such as a touch panel provided on the display apparatus, thereby setting the selected parameter to each of the control parts. In the case where a parameter is updated through re-performing of machine learning, the parameter holding apparatus 400 may assign and additionally store a new version number so as to perform version control of parameters, instead of overwriting already-held parameters. This allows to use the parameter of the latest version in a normal case, and to reuse the parameter previously set as the optimum value in the case where some kind of abnormality occurs, as an example.

[5.2 Modification 2]

In each of the above-described embodiments, a previously set evaluation program is executed, whereby the machine learning apparatus 500 performs machine learning and the parameters are thus adjusted. The present invention is not limited thereto. The parameters may be adjusted by machine learning during the actual machining performed by a machine tool, a robot or an industrial machine.

[5.3 Modification 3]

In each of the above-described embodiments, the motor control apparatuses 200 to 200C, the switching determining apparatuses 300 to 300C, the parameter holding apparatus 400, and the machine learning apparatus 500 are configured as individual devices. The present invention is not limited thereto. One casing including one of the motor control apparatuses 200 to 200C may house at least one among the corresponding one of the switching determining apparatuses 300 to 300C, the parameter holding apparatus 400, and the machine learning apparatus 500.

Each of the above-described components included in the motor control apparatuses and the motor control systems is able to be realized by hardware, software, or a combination thereof. The motor control method executed by cooperation of the above-described respective components included in the motor control apparatuses and the motor control systems is also able to be realized by hardware, software, or a combination thereof. Herein, being realized by software means being realized when a computer reads and executes a program.

Programs are stored by use of various types of non-transitory computer readable media and are able to be supplied to a computer. Non-transitory computer readable media include various types of tangible storage media. Examples of the non-transitory computer readable media include: a magnetic recording medium (e.g. flexible disk, magnetic tape, hard disk drive); a magneto-optical recording medium (e.g. magneto-optical disk); CD-ROM (Read Only Memory); CD-R; CD-R/W; and semiconductor memory (e.g. Mask ROM, PROM (Programmable ROM), EPROM (Erasable PROM), flash ROM, and RAM (random access memory)). Programs may be supplied to a computer by various types of transitory computer readable media. Examples of the transitory computer readable media include an electrical signal, an optical signal, and an electromagnetic wave. A transitory computer readable medium is capable of supplying a program to a computer via a wired communication path such as a wire and an optical fiber, or a wireless communication path.

EXPLANATION OF REFERENCE NUMERALS 10 10A 10B 10C MOTOR CONTROL SYSTEM
100 CNC APPARATUS
200 200A 200B 200C MOTOR CONTROL APPARATUS
300 300A 300B 300C SWITCHING DETERMINING APPARATUS
400 PARAMETER HOLDING APPARATUS
500 MACHINE LEARNING APPARATUS
2014 POSITION CONTROL PART
2017 SPEED CONTROL PART
2020 POSITION FEEDFORWARD CONTROL PART
2021 SPEED FEEDFORWARD CONTROL PART

What is claimed is:

1. A motor control apparatus comprising a controller configured to control a servo motor or a spindle motor of a machine tool, a robot or an industrial machine, the motor control apparatus comprising:
   a switching determining part or first communication means configured to communicate with the switching determining part, the switching determining part configured to determine a switching condition of the controller on a basis of position information on an axis related to control of the motor control apparatus;
   a machine learning part or second communication means configured to communicate with the machine learning part, the machine learning part configured to adjust one or more parameter(s) for the controller by machine learning for each of the switching conditions; and
   a parameter holding part or third communication means configured to communicate with the parameter holding part, the parameter holding part configured to hold the parameter adjusted by the machine learning part for each of the switching conditions,
   wherein the switching determining part, when determining the switching condition after adjustment of the parameter, uses the adjusted parameter corresponding to the switching condition in the controller.

2. The motor control apparatus according to claim 1, the motor control apparatus comprising:
   a position command generating part configured to generate a position command related to the axis;
   a position detecting part configured to detect a position related to the axis;
   a position controller configured to generate a speed command by use of the position command and feedback information on the position detected by the position detecting part;

a speed detecting part configured to detect a speed; and a speed controller configured to generate a torque command by use of the speed command generated by the position controller and feedback information on the speed detected by the speed detecting part, wherein the machine learning part adjusts a parameter for the position controller or the speed controller for each of the switching conditions.

3. The motor control apparatus according to claim 1, the motor control apparatus comprising:

a speed command generating part configured to generate the speed command;

a speed detecting part configured to detect the speed; and a speed controller configured to generate a torque command by use of the speed command and feedback information on the speed detected by the speed detecting part, wherein the machine learning part adjusts a parameter for the speed controller for each of the switching conditions.

4. The motor control apparatus according to claim 1, the motor control apparatus comprising:

at least either one of a position feedforward controller and a speed feedforward controller, the position feedforward controller configured to generate position feedforward information by use of the position command, the speed feedforward controller configured to generate speed feedforward information by use of the position command, wherein the machine learning part adjusts one or more parameter(s) for at least either one of the position feedforward controller and the speed feedforward controller for each of the switching conditions.

5. The motor control apparatus according to claim 1, wherein the machine learning part adjusts a plurality of different types of parameters for one of the switching conditions, and the switching determining part uses one parameter selected from among the plurality of parameters in the controller.

* * * * *